US009436823B1

United States Patent
Serebrin et al.

(10) Patent No.: US 9,436,823 B1
(45) Date of Patent: Sep. 6, 2016

(54) SYSTEM AND METHOD FOR DETECTING MALICIOUS CODE

(71) Applicant: Google Inc., Mountain View, CA (US)

(72) Inventors: Benjamin Charles Serebrin, Sunnyvale, CA (US); Brandon S. Baker, Redmond, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/109,005

(22) Filed: Dec. 17, 2013

(51) Int. Cl.
*G06F 11/00* (2006.01)
*G06F 21/56* (2013.01)
*G06F 12/10* (2016.01)
*G06F 12/14* (2006.01)
*G06F 12/16* (2006.01)

(52) U.S. Cl.
CPC ......... *G06F 21/561* (2013.01); *G06F 12/1027* (2013.01); *G06F 12/1081* (2013.01)

(58) Field of Classification Search
CPC ............... G06F 12/145; G06F 2009/45583; G06F 2221/2149
See application file for complete search history.

(56) References Cited

U.S. PATENT DOCUMENTS

| 5,924,126 A * | 7/1999 | Rosenthal | G06F 12/1081 710/3 |
| 5,987,557 A * | 11/1999 | Ebrahim | G06F 12/1483 710/200 |
| 6,725,321 B1 * | 4/2004 | Sinclair | G06F 3/0619 365/185.29 |
| 7,917,726 B2 * | 3/2011 | Hummel | G06F 12/1081 711/206 |
| 8,386,745 B2 * | 2/2013 | Kegel | G06F 12/10 711/205 |
| 2002/0065989 A1 * | 5/2002 | Chauvel | G06F 9/30043 711/130 |
| 2003/0140244 A1 * | 7/2003 | Dahan | G06F 9/30047 713/190 |

(Continued)

FOREIGN PATENT DOCUMENTS

WO 2013052121 A1 4/2013

OTHER PUBLICATIONS

Ben-Yehuda et al., "Utilizing IOMMUs for virtualization in Linux and Xen", downloaded on Nov. 7, 2013.

(Continued)

*Primary Examiner* — Dede Zecher
*Assistant Examiner* — Trang Doan
(74) *Attorney, Agent, or Firm* — Lerner, David, Littenberg, Krumholz & Mentlik, LLP

(57) ABSTRACT

A method and apparatus are provided to detect malicious code in a computing system, where the malicious code is obscured by manipulation of an input/output memory management unit. A peripheral component interconnect express (PCIe) device requests a translation of a bus address for a given device in the system and determines whether the requested translation was received. If the requested translation was received, the PCIe device further determines whether the bus address for the given device corresponds to a physical address for the given device. If the bus address for the given device does not correspond to the physical address for the given device, the PCIe device sends a notification that the computing system is potentially compromised.

22 Claims, 4 Drawing Sheets

(56) References Cited

U.S. PATENT DOCUMENTS

| | | | | |
|---|---|---|---|---|
| 2004/0148480 A1* | 7/2004 | Watt | G06F 9/4812 | 711/163 |
| 2004/0177261 A1* | 9/2004 | Watt | G06F 9/30181 | 713/193 |
| 2004/0260910 A1* | 12/2004 | Watt | G06F 9/30076 | 712/43 |
| 2005/0081020 A1* | 4/2005 | Volp | G06F 9/3851 | 712/228 |
| 2007/0294496 A1* | 12/2007 | Goss | G06F 12/1408 | 711/163 |
| 2008/0104711 A1* | 5/2008 | Johns | G06F 21/53 | 726/27 |
| 2008/0148005 A1* | 6/2008 | Moertl | G06F 12/1081 | 711/202 |
| 2008/0222663 A1* | 9/2008 | Carpenter | G06F 12/145 | 719/328 |
| 2009/0327576 A1* | 12/2009 | Oshins | G06F 9/45533 | 711/6 |
| 2010/0031360 A1* | 2/2010 | Seshadri | G06F 21/57 | 726/24 |
| 2010/0223447 A1* | 9/2010 | Serebrin | G06F 12/0253 | 712/225 |
| 2011/0047376 A1* | 2/2011 | Mittal | G06F 12/1441 | 713/164 |
| 2011/0078760 A1* | 3/2011 | De Perthuis | G06F 21/6218 | 726/1 |
| 2011/0208935 A1* | 8/2011 | Grisenthwaite | G06F 12/145 | 711/163 |
| 2012/0072906 A1* | 3/2012 | Tsirkin | G06F 12/1009 | 718/1 |
| 2012/0255011 A1* | 10/2012 | Sallam | G06F 21/564 | 726/24 |
| 2012/0255015 A1* | 10/2012 | Sahita | G06F 21/54 | 726/24 |
| 2012/0297057 A1* | 11/2012 | Ghosh | G06F 21/575 | 709/224 |
| 2013/0276056 A1* | 10/2013 | Epstein | G06F 21/604 | 726/1 |
| 2014/0040698 A1* | 2/2014 | Loh | G06F 13/1668 | 714/758 |
| 2014/0173236 A1* | 6/2014 | Kegel | G06F 12/1441 | 711/163 |
| 2014/0230067 A1* | 8/2014 | Sahita | G06T 1/60 | 726/26 |
| 2014/0331019 A1* | 11/2014 | Parker | G06F 12/1458 | 711/163 |

OTHER PUBLICATIONS

Willmann et al., Protection Strategies for Direct Access to Virtualized I/O Devices, <https://www.usenix.org/legacy/event/usenix08/tech/full_papers/willmann/willmann_html/>, pp. 1-24, downloaded Nov. 7, 2013.

\* cited by examiner

| Device | Bus address | Physical address |
|---|---|---|
| 1:2.3 | 0x3000 | 0x1000 |
| 4:5.6 | 0x2000 | 0x2000 |
| | | |
| | | |
| | | |

Fig. 3

SYSTEM AND METHOD FOR DETECTING MALICIOUS CODE

BACKGROUND

Detecting rootkits and other malicious code installed on a machine is potentially imperfect in that a CPU or device used to detect the malicious code may itself become compromised by the code. Moreover, the rootkits can be difficult to detect. For example, some scanners for detecting malicious code may include a programmable device which reads a target machine's memory space. But, as input/output memory management units (IOMMUs) can be used to remap traffic, a rootkit may manipulate the IOMMU to redirect memory reads of the rootkit's own memory to a benign copy of memory. In that instance, the conventional scanner would not detect the rootkit.

SUMMARY

The present disclosure provides a computer system and method for detecting malicious code that is obscured by IOMMU manipulation. A memory scanner uses address translation services to determine whether a given device's bus address corresponds to its physical address. If the addresses do not match, the computer system may be flagged as potentially compromised.

One aspect of the disclosure provides a method for detecting malicious code in a computer system. This method includes requesting, using one or more computing devices, a translation of a bus address for a given device, and determining, using the one or more computing devices, whether the requested translation was received. If the requested translation was received, the one or more computing devices determine whether the bus address for the given device corresponds to a physical address for the given device. If the bus address for the given device does not correspond to the physical address for the given device, a notification is sent that the computer system is potentially compromised.

Another aspect of the disclosure provides an apparatus for detecting malicious code in a computing system. The apparatus includes a memory storing a set of instructions, and one or more computing devices in communication with the memory. The one or more computing devices request a translation of a bus address for a given device and determine whether the requested translation was received. If the requested translation was received, the one or more computing devices determine whether the bus address for the given device corresponds to a physical address for the given device. If the bus address for the given device does not correspond to the physical address for the given device, the one or more computing devices provide for sending a notification that the computing system is potentially compromised.

Yet another aspect of the disclosure provides a non-transitory computer readable medium storing instructions executable by one or more computing devices to perform a method for detecting malicious code in a system. The method includes requesting a translation of a bus address for a given device and determining whether the requested translation was received. If the requested translation was received, the method further includes determining whether the bus address for the given device corresponds to a physical address for the given device. If the bus address for the given device does not correspond to the physical address for the given device, the method further includes sending a notification that the system is potentially compromised.

BRIEF DESCRIPTION OF THE DRAWINGS

FIG. 3 depicts an example address remapping table according to aspects of the disclosure.

DETAILED DESCRIPTION

The disclosure is directed to a system and method for detecting malicious code installed on a machine. In particular, the system and method detect whether an input/output memory management unit (IOMMU) has remapped traffic to redirect memory reads of a malicious memory to a benign memory.

To detect such malicious activity, a memory scanner, such as a direct memory access (DMA) bus master device, may be connected to a peripheral interconnect card express (PCIe) bus. The memory scanner may be, for example, a network interface controller (NIC) component, a graphics processing unit (GPU) component, or a standalone field programmable gate array (FPGA) or application specific integrated circuit (ASIC).

In detecting malicious activity, the memory scanner uses PCIe Address Translation Services (ATS). For example, the memory scanner requests an effective translation of a bus address used by a given system to access main memory to a system physical address for the given system. Upon receiving the translation, the memory scanner determines whether the bus address and the system physical address are mapped 1:1. If there is 1:1 mapping between the bus address and the system physical address, the memory scanner may determine that the IOMMU is not being used to hide memory from the bus master, and thus the given system is not compromised. However, if the mapping of bus address to system physical address is not 1:1, the memory scanner may determine that the given system is potentially compromised by malicious code. Alternatively or additionally, the memory scanner may detect that ATS is disabled by malicious software if, for example, ATS translation requests are refused. In this instance, the memory scanner may also determine that the given system is potentially compromised.

When the given system is determined not to be compromised, the memory scanner scans all memory, looking for signatures of malicious code. For example, the memory scan may be performed using a separate computer. As another example, the memory scanner may transmit sample data across the network. As yet another example, the memory scanner may perform pattern matching.

Figure 1:
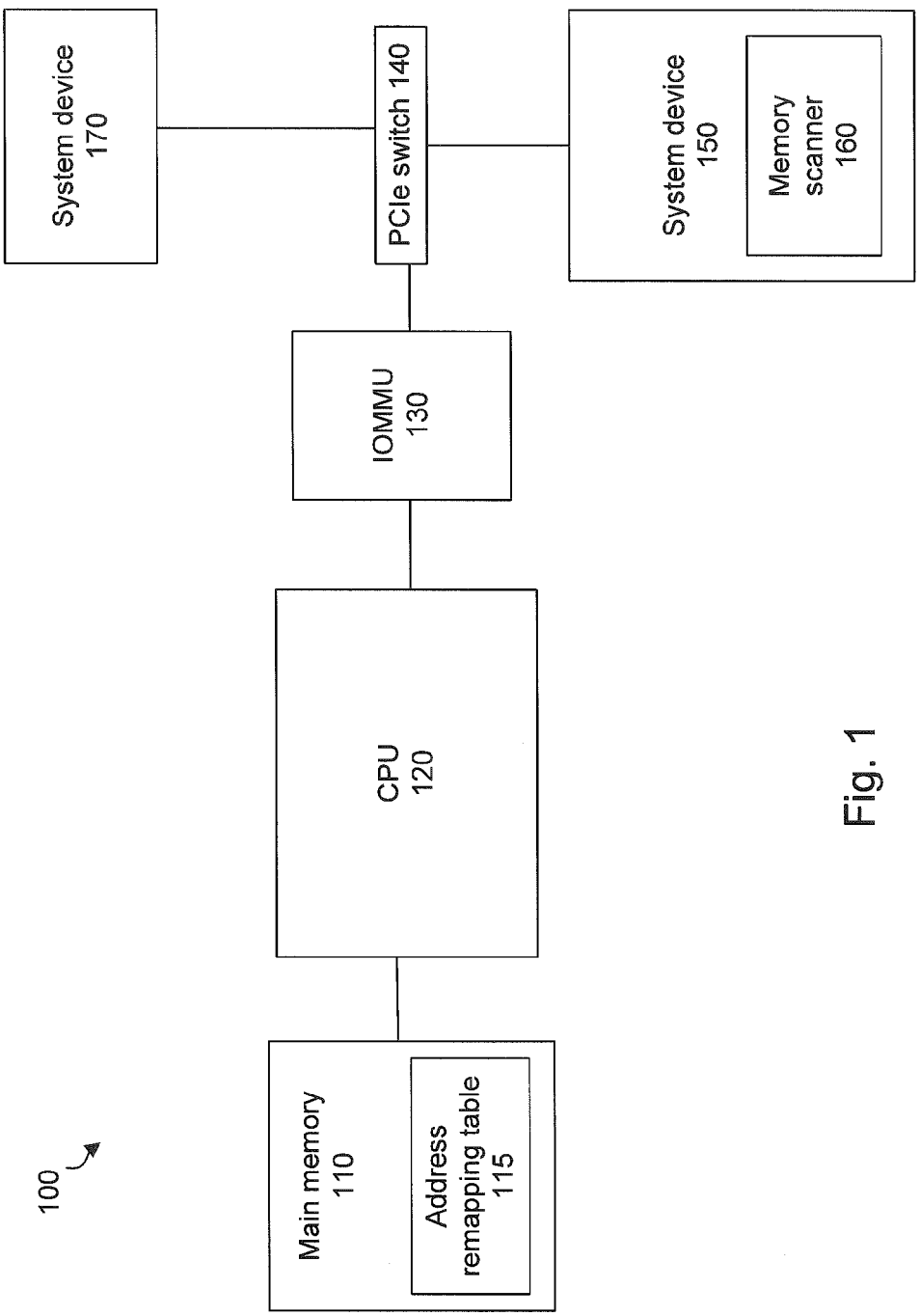
FIG. 1 is a schematic diagram of an example computer system according to aspects of the disclosure.

FIG. 1 depicts a schematic diagram of a system 100. The system 100 may be, for example, a system of computing devices interconnected on a motherboard. Such a system may be present in datacenters or other computing environments. The system 100 includes main memory 110 coupled to a central processing unit (CPU) 120. The CPU 120 is further coupled to an input/output memory management unit (IOMMU) 130. The IOMMU 130 and one or more system devices 150, 170 are connected via a peripheral interconnect card express (PCIe) switch 140.

The main memory 110 is accessible by the CPU 120, and may store data and instructions executable by the CPU 120. The main memory 110 may be any type of memory, such as read only memory, random access memory, removable storage media, cache, registers, or the like. The main memory 110 may store address remapping table 115, which is utilized by the IOMMU 130 as described below.

The CPU 120 is connected to and communicates with the main memory 110 by, for example, a data bus and an address bus. The CPU 120 may be a microprocessor residing on a chip, or any other known processor. While only a single CPU 120 is shown, any number of CPUs may be connected between the main memory 110 and the IOMMU 130. For example, the CPU 120 may be a multi-core processor.

The IOMMU 130 connects DMA-capable devices to the main memory 110. The IOMMU 130 further maps device addresses to physical addresses in the address remapping table 115.

The PCIe switch 140 is a high speed interconnect providing for interconnection of one or more system devices 150, 170 to other components in the system 100. The PCIe switch 140 may be a motherboard-level interconnect, an expansion card interface, or the like. The system devices may communicate through the PCIe switch 140 over one or more links.

The system devices 150, 170 may be any type of PCIe devices capable of communicating over the system 100. By way of example only, the system devices 150, 170 may be network interface controllers (NIC) or graphics processing units (GPU). Although only two system devices 150, 170 are shown, the system 100 may include any number of system devices.

As shown, the system device 150 includes memory scanner 160. The memory scanner 160 may be used to detect malicious code or software running on the CPU 120. For example, the memory scanner 160 can detect whether the IOMMU 130 has been manipulated and can scan the main memory 110 for bad signatures. The memory scanner 160, described in further detail below in connection with FIG. 2, may be a direct memory access (DMA) bus master device, a NIC component, a GPU component, or any other device. While the memory scanner 160 is shown as being part of the system device 150, according to other examples the memory scanner 160 may be a standalone device, such as a field programmable gate array (FPGA) or application specific integrated circuit (ASIC).

While the system 100 has been described above as a system of devices on a motherboard, it should be understood that the system 100 may be any configuration of electronically coupled computing devices. For example, the system may include a backplane interconnecting peripherals, an expansion card interface, or the like. As another example, the connection between the computing devices may be hard-wired connections, wireless connections, or any other type of connections. As yet another example, the system 100 may include TCP/IP, 802.11, Ethernet, InfiniBand, or any other type of network.

Figure 2:
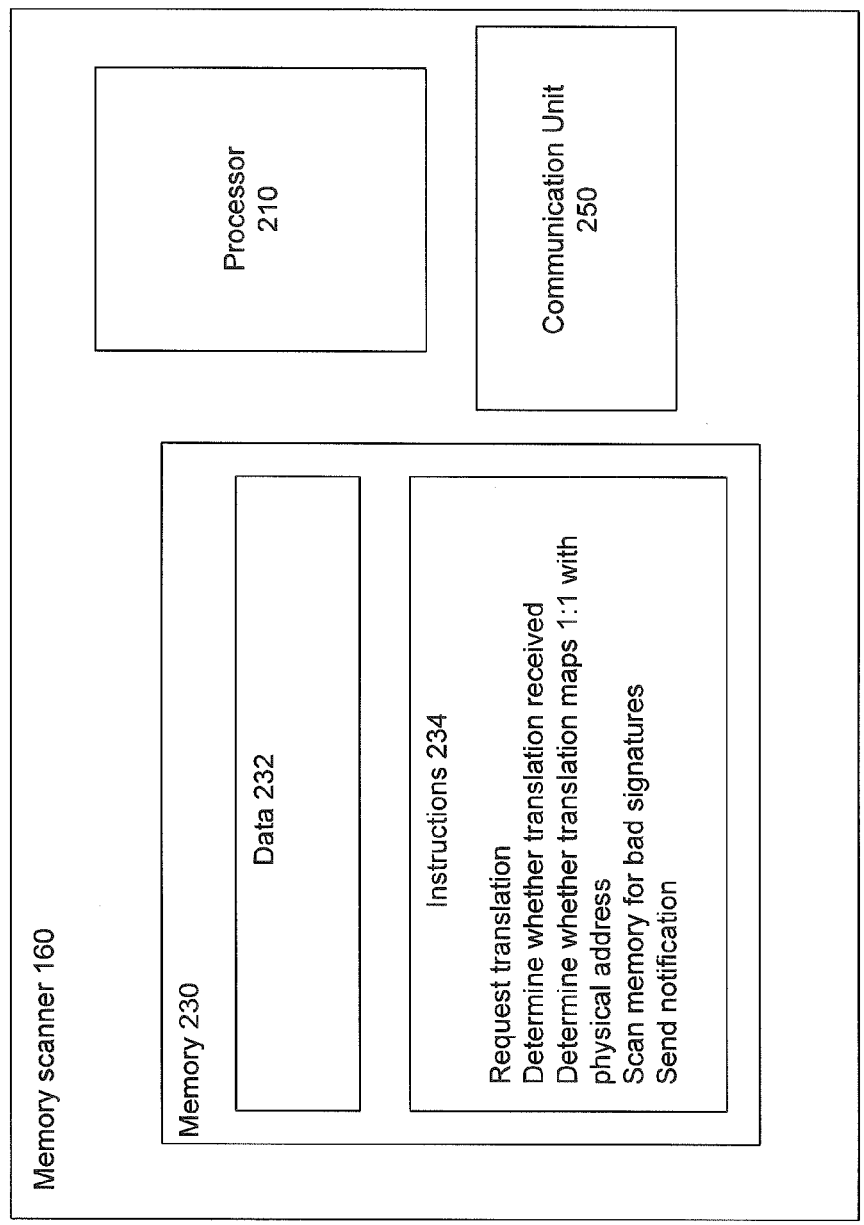
FIG. 2 is a block diagram of an example memory scanner according to aspects of the disclosure.

FIG. 2 depicts an example memory scanner 160. As illustrated, the memory scanner 160 may include a processor 210, a memory 230, and a communication unit 250. The processor 210 may be any well-known processor, such as a commercially available CPU or microcontroller. Alternatively, the processor may be a dedicated controller such as an ASIC. According to another example, the processor may be a state machine.

Memory 230 stores information accessible by processor 210, including instructions 234 that may be executed by the processor 210. The memory also includes data 232 that may be retrieved, manipulated or stored by the processor. The memory may be of any type capable of storing information accessible by the processor, such as a hard-drive, memory card, ROM, RAM, DVD, CD-ROM, write-capable, and read-only memories. The memory 230 includes data 232 that may be retrieved, manipulated or stored by the processor in accordance with the instructions 234. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

The instructions 234 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance.

The instructions 234 may be executed by the processor, for example, to perform malicious code detection operations. For example, the instructions 234 may provide for requesting an effective translation of a bus address used by the CPU 120 to access the main memory 110. The instructions 234 may further provide for determining whether the translation was received or refused, and determining whether a bus address matches a received physical address for the CPU 120. If the bus address and the received physical address do not match, it may be determined that the CPU 120 is compromised, for example by a rootkit or other malicious software. If the addresses do match, the instructions 234 may provide for scanning memory for bad signatures. If it is determined that the CPU 120 is compromised, the instructions 234 may provide for sending a notification to alert an operator.

Communication unit 250 may be an interface with the system 100 or an interface with the system device 150. For example, the communication unit 250 may be a network adapter, such as an Ethernet interface, WiFi interface, or any other interface capable of transmitting and receiving communications over the system 100. In this regard, if malicious code is detected, the memory scanner 160 may communicate such information over the system 100. According to another example, the communication unit 250 may include light emitting diodes (LEDs) or any other type of indicators, such as audio indicators, for communicating the detection of malicious code. The communication unit 250 may also communicate with the system device 150, for example, to request address translations. In such an example, the communication unit 250 may be a serial port interface, USB port interface, or any other interface capable of receiving and transmitting data from and to the system device 150.

Although FIG. 2 functionally illustrates the processor 210 and memory 230 as being within the same block, it will be understood that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor 120. Similarly, the processor 120 may actually comprise a collection of processors which may or may not operate in parallel.

FIG. 3 depicts an example address remapping table 315. As mentioned above in connection with FIGS. 1-2, the memory scanner 160 may request an effective translation of a bus address used by the memory scanner 160 to access the main memory 110, and compare this to the physical address of the CPU 120 to determine if the CPU 120 or code running on the CPU is compromised. The address remapping table 115 includes, for one or more devices, a mapping of the device's bus address to the device's physical address. In some instances, the IOMMU 130 may be manipulated such that the bus address for a given device, such as the CPU 110, is redirected. For example, if malicious code is installed on the CPU 120, the IOMMU 130 may be manipulated such that the corresponding bus address in the address remapping table 115 redirects to a benign memory address. In this instance, illustrated in example entry 325 of the address remapping table, the bus address and physical address do not have a 1:1 correspondence. However, entry 335 provides an example where the bus address and physical address for a device are mapped 1:1. Such a 1:1 mapping indicates that the IOMMU 130 was not manipulated to hide malicious memory for that page of memory. According to this example, further scanning, such as searching the memory 110 for bad signatures, may be used to detect malicious code.

Figure 4:
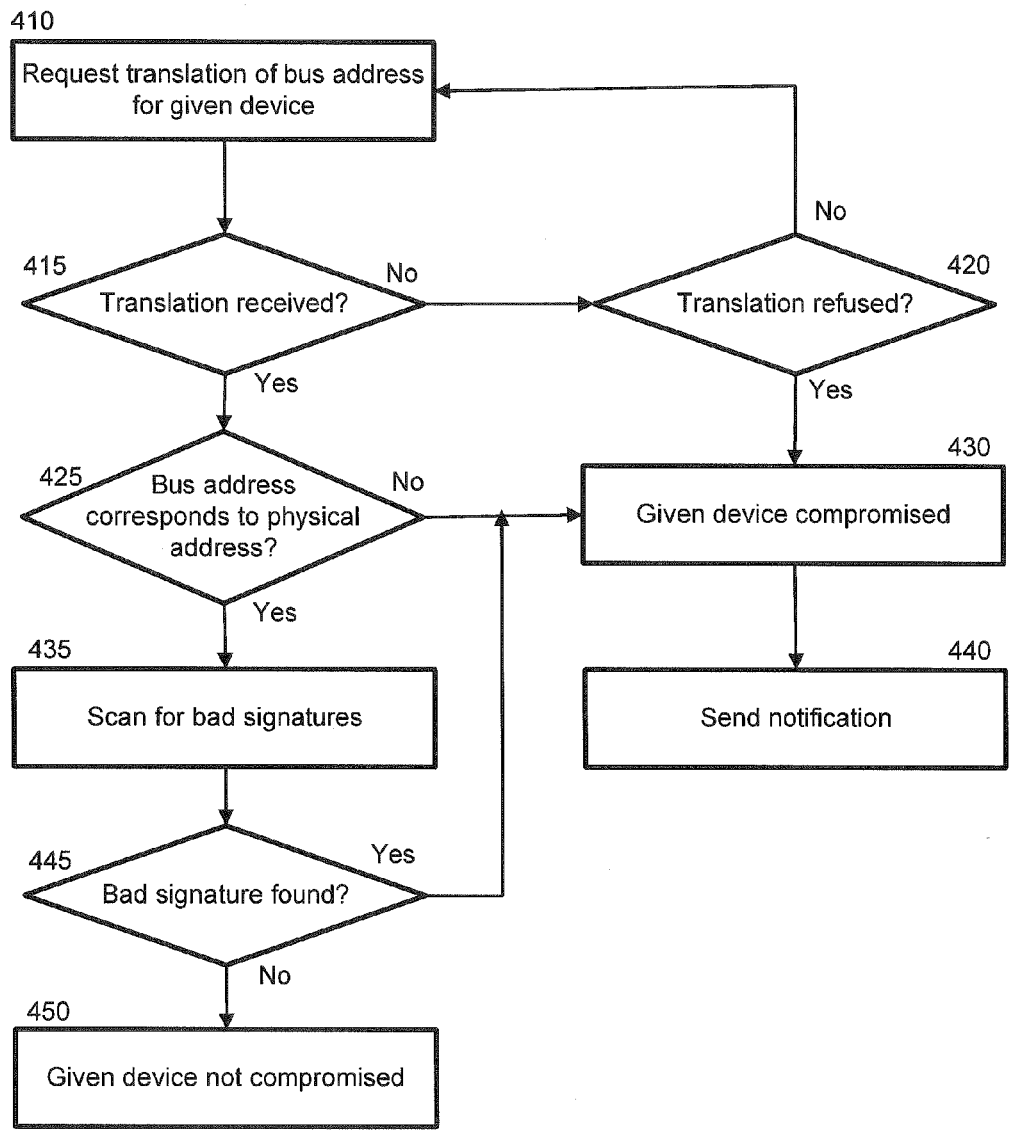
FIG. 4 is a flow diagram of an example method according to aspects of the disclosure.

FIG. 4 provides an example flow diagram illustrating a method 400, which may be executed by the memory scanner 160. The method 400 is described below with reference to the system of FIG. 1. However, it should be understood that the method 400 may be implemented by any of a variety of systems having different configurations. It should also be understood that the operations involved in the above methods need not be performed in the precise order described. Rather, various operations may be handled in a different order or simultaneously, and operations may be added or omitted.

In block 410, the memory scanner 160 requests a translation of a bus address for a given device, such as the CPU 120 of FIG. 1. For example, the memory scanner may use address translation services to request a bus address of the given device, where the bus address may be mapped by the IOMMU 130 in the address remapping table 115.

In block 415, the memory scanner 160 determines whether a translation was received. If a translation was not received, the scanner may determine if the translation was refused (block 420). For example, translations may be refused if ATS is disabled by malicious code running on the CPU 120. If the translation was refused, it may be determined that the given device (e.g., the CPU 120) is compromised (block 430). However, if the translation was not refused, non-receipt of the translation may have been an error. Accordingly, in this instance the method 400 returns to block 410.

If the translation was received in block 415, the method 400 proceeds to block 425. Here, the memory scanner 160 determines whether the received bus address corresponds to a physical address of the given device. For example, the memory scanner 160 may determine if there is a 1:1 mapping between the received bus address and the physical address of the CPU 120.

If the received bus address does not correspond to the device physical address, it may be determined that the given device is compromised (block 430). For example, it may be assumed that the incorrect mapping is a result of IOMMU manipulation to hide malicious software. If, however, the addresses have a 1:1 correspondence, the method 400 proceeds to block 435.

In block 435, the memory scanner 160 scans the system for bad signatures using the translated address obtained in block 415. For example, the scanner 160 may scan the main memory 110, the CPU 120, or any of the other devices in the network for evidence of malicious software or activity. According to some examples, the scan may be performed using a separate computing device. According to other examples, the memory scanner 160 may transmit sample data across the network. According to an even further example, the memory scanner 160 may perform pattern matching.

If any bad signatures are detected in block 445, the given device may be considered to be compromised. However, if no bad signatures are found, the given device may be determined to be safe (block 450).

If the given device is determined to be compromised, the memory scanner 160 may send a notification in block 440. For example, the memory scanner 160 may transmit a communication over the system 100. According to another example, the memory scanner 160 may include an LED or other indicator that may be activated when a compromised device is detected. For example, in a system including multiple CPUs, an LED may be designated for each CPU to indicate which one is compromised. According to another example, the memory scanner 160 may notify an operator of the compromised device by automatically turning off the NIC or any other device in the system or resetting the system.

The above described techniques are advantageous in that they provide for detection of malicious code from an outside device that is protected from the malicious code. Moreover, the outside device is able to see through obfuscations and hiding attempts of the malicious code, without use of a hypervisor.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method for detecting malicious code in a computing system, comprising:
   requesting, by one or more peripheral computing devices, a translation from an input/output memory management unit (IOMMU) of a bus address mapped by the IOMMU for a given device, wherein the IOMMU is separate from the one or more peripheral devices;
   determining, using the one or more peripheral computing devices, whether the requested translation was received from the IOMMU;
   if the requested translation was received at the one or more peripheral devices from the IOMMU, determining, using the one or more peripheral computing devices, whether the received translated bus address for the given device matches a physical address for the given device; and if the received translated bus address for the given device does not match the physical address for the given device, sending a notification that the computing system is potentially compromised.

2. The method of claim 1, further comprising:
if the requested translation was not received, determining whether the requested translation was refused; and
if the requested translation was refused, classifying the computing system as potentially compromised.

3. The method of claim 2, wherein determining whether the translation was refused comprises determining whether address translation services were disabled.

4. The method of claim 1, further comprising, if the bus address for the given device corresponds to the physical address for the given device, scanning a main memory using the provided translation associated with the given device for signatures of malicious code.

5. The method of claim 4, wherein scanning the main memory comprises at least one of transmitting sample data through the computing system and pattern matching.

6. The method of claim 1, wherein sending the notification comprises turning off a component in the computing system.

7. The method of claim 6, wherein turning off the component comprises turning off a network interface controller.

8. The method of claim 1, wherein sending the notification comprises issuing one or more of a visual or audio alert.

9. The method of claim 1, wherein sending the notification comprises transmitting data through the computing system.

10. The method of claim 1, wherein sending the notification comprises resetting the computing system.

11. An apparatus for detecting malicious code in a computing system, comprising:
a memory storing a set of instructions;
a memory management unit mapping bus addresses; and
one or more peripheral computing devices in communication with the memory and the memory management unit and separate from the memory management unit, the one or more peripheral computing devices to:
request a translation of a bus address for a given device from the memory management unit;
determine whether the requested translation was received from the memory management unit;
if the requested translation was received from the memory management unit, determine whether the received translated bus address for the given device matches a physical address for the given device; and
if the received translated bus address for the given device does not match the physical address for the given device, provide for sending a notification that the computing system is potentially compromised.

12. The apparatus of claim 11, wherein the one or more computing devices and memory are coupled to the computing system via a peripheral component interconnect express (PCIe) switch, the PCIe switch further coupled to an input/output memory management unit.

13. The apparatus of claim 12, wherein the one or more computing devices and memory are components within one of a network interface controller or a graphics processing unit.

14. The apparatus of claim 12, wherein the one or more computing devices and memory reside on one of a field programmable gate array or an application specific integrated circuit.

15. The apparatus of claim 11, further comprising a communication unit coupled to the one or more computing devices, the communication unit sending the notification that the computing system is potentially compromised.

16. The apparatus of claim 15, wherein the communication unit sends the notification by performing at least one of turning off a component in the computing system, resetting the computing system, issuing a visual or audio alert, or sending data through the computing system.

17. The apparatus of claim 11, wherein the one or more computing devices further determines whether the requested translation was refused, and classifies the computing system as potentially compromised if the requested translation was refused.

18. The apparatus of claim 17, wherein the one or more computing devices determines that the translation was refused if address translation services were disabled.

19. The apparatus of claim 11, wherein the one or more computing devices include a state machine.

20. A non-transitory computer readable medium storing instructions executable by one or more computing devices to perform a method for detecting malicious code in a system, the method comprising:
requesting a translation of a bus address mapped by an input/output memory management unit (IOMMU) for a given device, the IOMMU being separate from the one or more computing devices;
determining whether the requested translation was received from the IOMMU;
if the requested translation was received from the IOMMU, determining whether the received translated bus address for the given device matches a physical address for the given device; and
if the received translated bus address for the given device does not match the physical address for the given device, sending a notification that the system is potentially compromised.

21. The non-transitory computer readable medium of claim 20, the method further comprising:
if the requested translation was not received, determining whether the requested translation was refused; and
if the requested translation was refused, classifying the system as potentially compromised.

22. The non-transitory computer readable medium of claim 20, wherein sending the notification comprises at least one of turning off a component in the system, issuing a visual or audio alert, or sending data through the system.

* * * * *